United States Patent
Takamura et al.

(10) Patent No.: US 8,079,803 B2
(45) Date of Patent: Dec. 20, 2011

(54) GAS TURBINE AND COOLING AIR SUPPLY STRUCTURE THEREOF

(75) Inventors: Keita Takamura, Hyogo-ken (JP);
Shinya Hashimoto, Hyogo-ken (JP);
Masanori Yuri, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 842 days.

(21) Appl. No.: 12/164,793

(22) Filed: Jun. 30, 2008

(65) Prior Publication Data
US 2009/0324388 A1 Dec. 31, 2009

(51) Int. Cl.
*F01D 5/14* (2006.01)
*F03D 11/00* (2006.01)
*F04D 29/38* (2006.01)

(52) U.S. Cl. .................................... 415/115; 415/116

(58) Field of Classification Search .......... 415/115, 415/116, 179
See application file for complete search history.

(56) References Cited

U.S. PATENT DOCUMENTS

| | | | | |
|---|---|---|---|---|
| 3,791,758 A | * | 2/1974 | Jenkinson | 415/116 |
| 3,818,696 A | * | 6/1974 | Beaufrere | 60/39.512 |
| 5,327,719 A | * | 7/1994 | Mazeaud et al. | 60/785 |
| 5,522,698 A | | 6/1996 | Butler et al. | |
| 5,645,397 A | | 7/1997 | Soechting et al. | |
| 5,819,524 A | * | 10/1998 | Bosley et al. | 60/39.465 |
| 6,179,555 B1 | | 1/2001 | Tremaine | |
| 6,230,483 B1 | * | 5/2001 | Sakon et al. | 60/806 |
| 6,427,448 B1 | | 8/2002 | Reichert | |
| 6,772,581 B2 | * | 8/2004 | Ojiro et al. | 60/39.182 |
| 2003/0017050 A1 | | 1/2003 | Simeone et al. | |
| 2004/0046326 A1 | | 3/2004 | Yuri et al. | |
| 2006/0133921 A1 | * | 6/2006 | Hays | 415/84 |
| 2007/0059158 A1 | | 3/2007 | Alvanos et al. | |

FOREIGN PATENT DOCUMENTS

| | | |
|---|---|---|
| JP | 59-41001 B2 | 10/1984 |
| JP | 9-112205 A | 4/1997 |
| JP | 9-512607 A | 12/1997 |
| JP | 2000-310127 A | 11/2000 |
| JP | 2002-517652 A | 6/2002 |
| JP | 2002-526705 A | 8/2002 |
| JP | 2003-65001 A | 3/2003 |
| JP | 2004-100686 A | 4/2004 |
| JP | 2007-77983 A | 3/2007 |

OTHER PUBLICATIONS

International Search Report of PCT/JP2009/057984, mailing date Jul. 28, 2009.

* cited by examiner

*Primary Examiner* — S. V Clark
(74) *Attorney, Agent, or Firm* — Westerman, Hattori, Daniels & Adrian, LLP

(57) ABSTRACT

The present invention includes an introducing passage that is provided within a turbine stationary blade fixed within a turbine casing and that communicates an interior of the turbine casing with an exterior thereof; a nozzle that is provided in an inner circumference of the turbine stationary blade in a manner that the nozzle communicates with the introducing passage and that includes an outlet facing the opening of the rotor cavity and a swirler at the outlet; and a pressurizing passage that communicates a cooling passage with a rotor cavity. In this arrangement, the outlet of the nozzle and the connecting opening of the pressurizing passage are arranged so that distances of the outlet and of the connecting opening from the central axis line in the radial direction of the rotor are the same distance r.

4 Claims, 4 Drawing Sheets

GAS TURBINE AND COOLING AIR SUPPLY STRUCTURE THEREOF

BACKGROUND OF THE INVENTION

1. Field of the Invention

The present invention relates to a cooling air supply structure of a gas turbine that supplies cooling air to a turbine rotor blade and to a gas turbine.

2. Description of the Related Art

A gas turbine includes a compressor, a combustion chamber, and a turbine. The compressor compresses air taken in from an air intake, and thus the air is turned into high-temperature and high-pressure compressed air. The combustion chamber supplies fuel to the compressed air, thereby igniting the compressed air, and thus the compressed air is turned into high-temperature and high-pressure combustion gas. The turbine includes turbine stationary blades and turbine rotor blades within a casing thereof, in which the turbine stationary blades and the turbine rotor blades are alternately arranged. The turbine rotor blades are driven by the combustion gas supplied to an exhaust passage. Thus, the rotor connected to a power generator is rotationally driven. The combustion gas is converted into static pressure by a diffuser after driving the turbine, and is discharged into atmospheric air. In the gas turbine in the above configuration, a temperature of combustion gas acting on a plurality of turbine rotor blades reaches as high as 1500 degree centigrade, and the turbine rotor blades may be damaged because the turbine rotor blades are heated by the combustion gas. Therefore, the turbine rotor blades are cooled by supplying cooling air to each of turbine rotor blades.

Some of conventional gas turbines take out air from a compressor, and supply the air to the turbine rotor blades as cooling air. A cooling air supply structure of such conventional gas turbines includes an introducing passage extending in the radial direction of the rotor within each turbine stationary blade. The introducing passage is connected to an external pipe connected to a compressor in an exterior of the turbine stationary blades, and is connected to an air passage in an interior of the turbine stationary blades. The air passage faces in the direction of the rotor, and an outlet thereof is provided in the rotational direction of the rotor. A rotor cavity is provided on the rotor side of a space surrounded between a disk inner than the stationary blades in the radial direction of the rotor and the rotor. The rotor cavity is formed in such a way that an opening is formed thereon so that cooling air is introduced therethrough in the direction of the outer diameter of the rotor so that the rotor cavity is connected to a cooling passage provided within the turbine rotor blade behind the turbine stationary blade via a pressurizing passage extending in the radial direction of the rotor. The cooling air introduced to the introducing passage of the turbine stationary blade via the external pipe from the compressor is provided with swirl flow by being discharged so that the cooling air has a velocity component in the same direction of the rotation of the rotor, and is transmitted to the cavity so that relative velocity relative to the circumferential velocity of the rotor is reduced. Thus, the cooling air is supplied to the cooling passage via the pressurizing passage. A sealing member is provided between the inner circumference of the turbine stationary blade and the outer circumference of the rotor so that leakage of the cooling air into a casing is prevented (see, for example, Japanese Patent Application Publication No. 2002-517652 and Japanese Patent Application Laid-open No. 2000-310127).

In the cooling air supply structure of conventional gas turbines, the opening of the cavity is formed on the outer circumference of the rotor and the outlet of the air passage is provided on the inner circumference of the turbine stationary blade opposing the outer circumference of the rotor. In the configuration, a distance in the radial direction of the rotor between the outlet of the air passage and the central axis line of the rotor is larger than a distance in the radial direction of the rotor between a connecting opening of the pressurizing passage on the cavity and the central axis line of the rotor. Therefore, by rotation of the rotor, pressure is lower at the position of the connecting opening of the pressurizing passage than at the position of the outlet of the air passage. As a result, pressure acting on the seal member increases and the differential pressure across the seal member increases. Therefore, cooling air leaks into combustion gas, thereby reducing a thermal efficiency of the gas turbine.

SUMMARY OF THE INVENTION

An object of the present invention is to at least partially solve the problems in the conventional technology.

A cooling air supply structure of a gas turbine according to an aspect of the present invention includes, in a cooling air supply structure that is provided in a gas turbine in which compressed air compressed by a compressor is ignited by supplying fuel thereto in a combustion chamber and combustion gas thus generated is transferred to a turbine casing of the turbine, thereby generating rotating power a rotor and that supplies cooling air to a turbine rotor blade of the turbine, an introducing passage that is provided within a turbine stationary blade fixed within the turbine casing and that connects an interior and an exterior of the turbine casing; a rotor cavity that is provided in the rotor and that forms a space having an opening along the circumferential direction of the rotor; a nozzle that is provided on an inner circumference of the turbine stationary blade in a manner that the nozzle communicates with the introducing passage, and that has an outlet for cooling air facing the opening of the rotor cavity, and a swirler at the outlet; a seal member provided between the turbine stationary blade and the rotor; a cooling passage provided within a fixing member that is fixed to the rotor and rotates therewith and that fixes the turbine rotor blade; and a pressurizing passage that communicates the cooling passage to the rotor cavity, in which the outlet of the nozzle and a connecting opening of the pressurizing passage on the rotor cavity are arranged so that distances of the outlet and of the connecting opening from the central axis line of the rotor in a radial direction of the rotor are same.

A gas turbine according to another aspect of the present invention includes, in a gas turbine in which compressed air compressed by a compressor is ignited by supplying fuel thereto in a combustion chamber and combustion gas thus generated is transferred to a turbine casing of the turbine, thereby generating rotating power of a rotor, an introducing passage that is provided within a turbine stationary blade fixed within the turbine casing and that connects an interior and an exterior of the turbine casing; a rotor cavity that is provided in the rotor and that forms a space having an opening along a circumferential direction of the rotor; a nozzle that is provided on an inner circumference of the turbine stationary blade in a manner that the nozzle communicates with the introducing passage, and that has an outlet for cooling air facing the opening of the rotor cavity, and a swirler at the outlet; a seal member provided between the turbine stationary blade and the rotor; a cooling passage that is provided within a fixing member that is fixed to the rotor and rotates therewith and that fixes the turbine rotor blade; and a pressurizing passage that communicates the cooling passage to the rotor cavity, in which the outlet of the nozzle and a connecting opening of the pressurizing passage on the rotor cavity are arranged so that distances of the outlet and of the connecting opening from the central axis line of the rotor in the radial direction of the rotor are same.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a cooling air supply structure of a gas turbine and of a gas turbine according to the present invention are described below in greater detail with reference to the accompanying drawings. The present invention, however, is not limited thereto.

Figure 1:
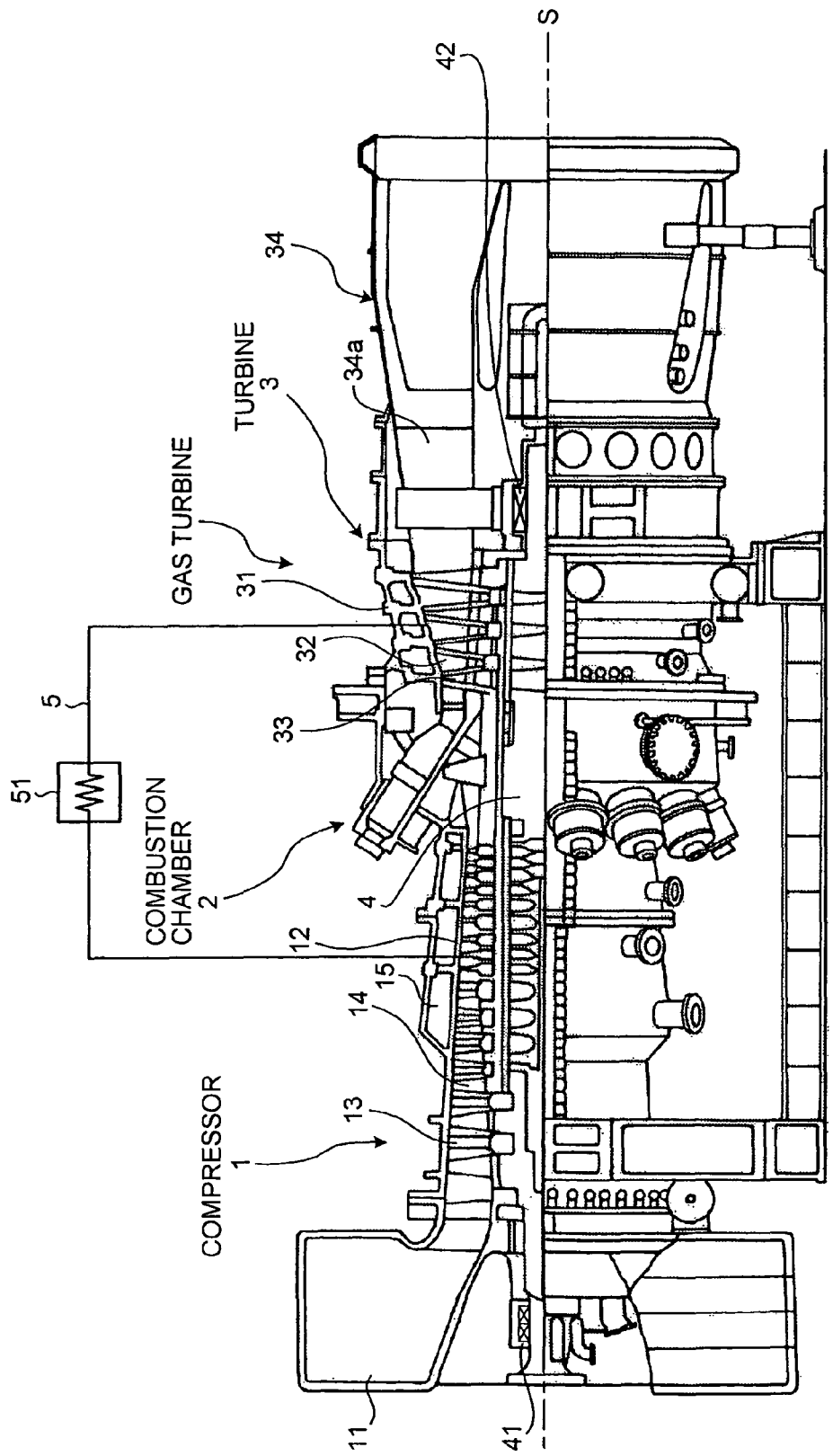
FIG. 1 is a schematic of a configuration of a gas turbine according to an embodiment of the present invention.
Figure 2:
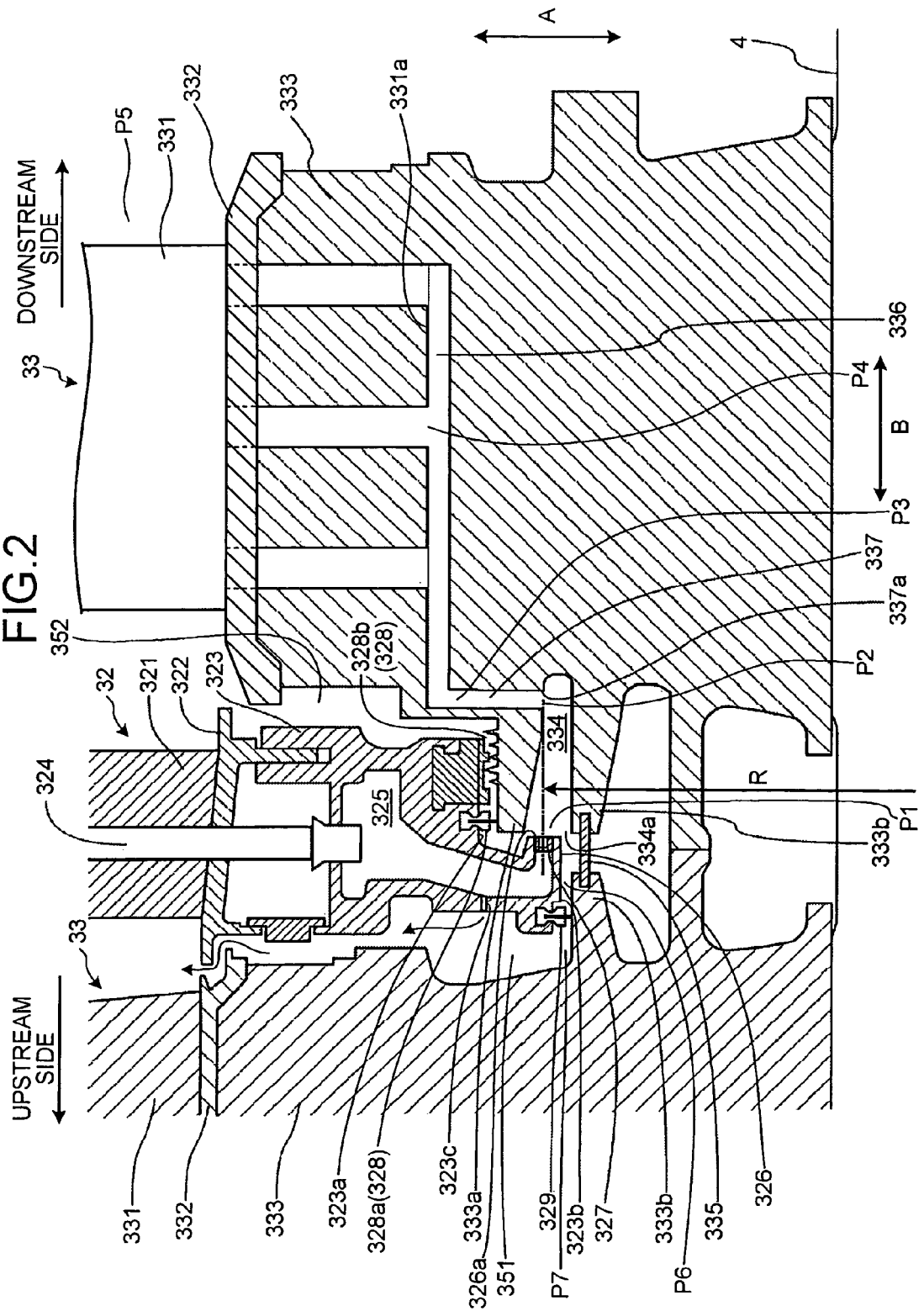
FIG. 2 is a schematic of an inner structure of the gas turbine shown in FIG. 1.

FIG. 1 is a schematic of a configuration of a gas turbine according to the present invention. FIG. 2 is a schematic of an inner structure of the gas turbine shown in FIG. 1.

In a cooling air supply structure of a gas turbine and a gas turbine according to the present embodiment, extracted air taken from an intermediate area of a compressor is supplied to a rotor blade as cooling air via a turbine stationary blade. The gas turbine includes a compressor 1, a combustion chamber 2, and a turbine 3 as shown in FIG. 1. The compressor 1 includes an air intake 11 that takes air in. In a compressor casing 12, a plurality of compressor stationary blades 13 and compressor rotor blades 14 are arranged alternately. Outside the compressor casing 12, an air extraction manifold 15 is provided. The combustion chamber 2 supplies fuel to the compressed air compressed by the compressor 1 and ignites the compressed air by a burner, thereby a forming high-temperature and high-pressure combustion gas. In the turbine 3, a plurality of turbine stationary blades 32 and turbine rotor blades 33 are arranged alternately in a turbine casing 31.

Behind the turbine casing 31, an exhaust hood 34 is provided having an exhaust air diffuser 34a continued to the turbine 3. A rotor 4 is disposed so that the rotor 4 penetrates the centers of the compressor 1, the combustion chamber 2, the turbine 3, and the exhaust hood 34. The rotor 4 is provided so that the end thereof on the side of compressor 1 is supported by a bearing 41 as well as the other end thereof on the side of the exhaust hood 34 is supported by a bearing 42 so that the rotor 4 can rotate freely about the central axis line S of the rotor 4. A plurality of disks (fixing members) are fixed to the rotor 4, and the rotor blades 14 and 33 are attached to the disks. A drive shaft of a power generator (not shown) is attached to the end of the rotor 4 on the side of the exhaust hood 34.

Air taken in from the air intake 11 of the compressor 1 passes through the compressor stationary blades 13 and the compressor rotor blades 14, and thus is compressed to be high-temperature and high-pressure compressed air. The compressed air is supplied with a predetermined fuel and ignited in the combustion chamber 2. The high-temperature and high-pressure combustion gas thus generated in the combustion chamber passes through the turbine stationary blades 32 and the turbine rotor blades 33 that constitute the turbine 3, and thus the rotor 4 is rotationally driven. By providing rotating power to the power generator connected to the rotor 4, electric power is generated. Exhaust gas after rotationally driving the rotor 4 is converted to static pressure by the exhaust air diffuser 34a of the exhaust hood 34, and is discharged to atmospheric air.

The gas turbine with the configuration above is configured so that, as shown in FIG. 1, some of the compressed air compressed by the compressor 1 is extracted by an external pipe 5 from the air extraction manifold 15 located in an intermediate area of the compressor casing 12 and the compressed air (the extracted air) is transferred to an interior of the turbine casing 31 as cooling air. An external cooler 51 may be provided on the external pipe 5. The cooling air transferred to an interior of the turbine casing 31 is supplied to the turbine rotor blades 33. The cooling air supply structure that supplies cooling air to the turbine rotor blades 33 will be described in greater detail below.

FIG. 2 is a schematic of an inner structure of the gas turbine shown in FIG. 1 according to the present embodiment. As shown in FIG. 2, in each turbine stationary blade 32, an introducing passage 324 is provided. The introducing passage 324 includes a tubular body extending in a radial direction of the rotor 4 (a direction of an arrow A shown in FIG. 2) along a stationary blade 321 within the stationary blade 321. The introducing passage 324 is communicated with the external pipe 5 outside the turbine casing 31, and thus the introducing passage 324 introduces cooling air from outside of the turbine casing 31. The introducing passage 324 penetrates an inner shroud 322 of the stationary blade 321. In an inner circumference of the turbine stationary blade 321, a retaining ring 323 formed in a circular manner is provided along a circumferential direction of the rotor 4. Within the retaining ring 323, a stationary blade cavity 325 is formed as a space therewithin. Within the stationary blade cavity 325, an end of the introducing passage 324 is provided. Thus, the stationary blade cavity 325 is communicated with the introducing passage 324. The cooling air supplied to the stationary blade cavity 325 is discharged to a rotor cavity 334 as swirl flow from each tip of a plurality of nozzle 326 provided on a bottom portion (an inner portion in the radial direction of the rotor) of the stationary blade cavity 325 so that the swirl flow flows along a plane parallel to a central axis line S of the rotor 4 so that the swirl flow is directed in a certain angle with respect to the central axis line S.

Each of the turbine rotor blades 33 fixed to the rotor 4 is constituted of a plurality of rotor blades 331. The rotor blades 331 are mounted on a disk (a fixing member) 333 along an outer circumference of the disks 333 in a circular manner. The disks 333 neighboring each other are stacked together fastened by spindle bolts (not shown) in an extending direction of the central axis line S of the rotor 4 (a direction of an arrow B shown in FIG. 2), thereby forming the rotor 4 integrated as a whole.

A board-shaped arm section 333a is projected toward the upstream side (left side seen in FIG. 2) in the shaft direction of the rotor 4 from the disk 333 located on the downstream side, and then a seal portion 328 is provided between the arm section 333a and an inner edge surface 323a of the retaining ring 323 at an area opposed by the retaining ring 323 (the inner circumference thereof) of the turbine stationary blade 32, so that cooling air does not leak to a combustion chamber cavity 352 on the downstream side from a gap between the retaining ring 323, which is a stationary member, and the disk 333, which is a rotating member. The rotor cavity 334 is formed so that the rotor cavity 334 is disposed inner than the arm section 333a in the radial direction of the rotor and is surrounded by board-shaped arm sections 333b projected from the opposing surfaces on the neighboring disks 333 and the arm section 333a. The arm sections 333a and 333b are formed in a circular manner along the circumferential direction of the rotor 4. A seal portion 329 is provided for a space between the arm section 333b projected from the disk 333 located on the upstream side and an inner edge surface 323b of the retaining ring 323, so that cooling air is prevented from leaking to a combustion chamber cavity 351 on the upstream side. A seal member 335 seals a gap between the tips of a pair of the arm sections 333b projected from the disks 333 on the upstream and the downstream sides. Thus, a space of the rotor cavity 334 including the opposing surfaces of the neighboring disks 333 and having an opening 334a opening toward the upstream side along the circumferential direction of the rotor 4 is defined in a circular manner along the circumferential direction of the rotor 4.

A purge hole 323c is provided by drilling a hole on a lower part (an area closer to the center of the rotor 4) of the retaining ring 323 so that the cooling air in the stationary blade cavity 325 is purged to the combustion chamber cavity 351 on the upstream side. The purge hole 323c sends out a small amount of cooling air continuously. Thus, the purge hole 323c prevents the combustion gas on the side of the combustion gas (a gas path) from flowing backward to the combustion chamber cavity 351 on the upstream side.

To supply the cooling air from the rotor cavity 334 to each rotor blade 331, a plurality of cooling passages 336 and pressurizing passages 337 are formed in a circular manner on the disk 333 on the downstream side constituting the rotor cavity 334, as seen along a plane perpendicular to the direction of the rotor shaft. The cooling passages 336 are formed along the extending direction of the central axis line S of the rotor 4 within the disk 333, are arranged outer than the rotor cavity 334 in the radial direction of the rotor 4, and are communicated with the rotor blade 331 at a rotor base 331a of the rotor blade. The pressurizing passages 337 are provided so that the pressurizing passages 337 extends in the radial direction of the rotor 4, and are communicated with the cooling passages 336 on the downstream side of the pressurizing passages 337. On the upstream side of the pressurizing passages 337, the pressurizing passages 337 are communicated with the rotor cavity 334 via a connecting opening 337a. The cooling air in the rotor cavity 334 is introduced from the connecting opening 337a of the pressurizing passages 337 to the pressurizing passages 337 provided by drilling holes in the disk 333, flows through the cooling passages 336, is supplied into the rotor blade 331 from the rotor base 331a of the rotor blade 331, and then is discharged to combustion gas after cooling inner wall and other sections of the rotor blade 331.

Each of the nozzles 326 provided inner than the retaining ring 323 of the turbine stationary blade 321 in the radial direction of the retaining ring 323 is arranged opposing the opening 334a of the rotor cavity 334. The nozzles 326 include a plurality of outlets 326a along the circumferential direction of the rotor 4. The outlets 326a are provided so as to be parallel to the rotor shaft line toward the opening 334a of the rotor cavity 334. A swirler 327 is provided on the outlet 326a of each nozzle 326. The swirler 327 guides the cooling air in the rotational direction of the rotor 4 and provides swirl flow to the cooling air, thereby facilitating transfer of the cooling air into the rotor cavity 334. The nozzles 326 having the swirler 327 are arranged about the central axis line S of the rotor 4 in a circular manner so that the cooling air is sent out in a certain angle with respect to the central axis line S. The outlet 326a of the nozzle 326 is positioned so that the outlet 326a is within the entrance cross section of the opening 334a of the rotor cavity 334. The outlet 326a of the nozzle 326 and the connecting opening 337a of the pressurizing passages 337 are disposed so that a distance in the radial direction of the rotor 4 between the outlet 326a and the central axis line S of the rotor 4 is the same as a distance in the radial direction of the rotor 4 between the connecting opening 337a and the central axis line S. The nozzle 326 may be in any type, either a tubular nozzle or an airfoil nozzle.

As described above, the seal portion 328 is provided between the inner edge surface 323a of the retaining ring 323 of the turbine stationary blade 321 and the outer circumference of the arm section 333a. The seal portion 329 is disposed between the arm section 333b projected from the disk 333 on the upstream side and the inner edge surface 323b of the retaining ring 323. The seal portions 328 and 329 prevent cooling air from leaking to the combustion chamber cavity 352 on the downstream side and to the combustion chamber cavity 351 on the upstream side, thereby avoiding drop of thermal efficiency of the gas turbine. The seal portion 328 is constituted of a brush seal 328a and a labyrinth seal 328b, and the seal portion 329 is constituted of a brush seal. The seal portions are not limited to the particular type described above. A leaf seal or any other type of seal may be employed instead of a brush seal.

In the cooling air supply structure with the configuration described above, some of the compressed air compressed by the compressor 1 is extracted by the external pipe 5 from the air extraction manifold 15 of the compressor casing 12. The compressed air is fed to the introducing passage 324 of the turbine stationary blade 321 as cooling air. The cooling air is discharged from the outlet 326a of the nozzle 326 via the stationary blade cavity 325. As described above, the cooling air is discharged from the nozzle 326 so that the cooling air has a velocity component in a tangential direction of the rotational direction of the rotor 4. Therefore, the difference of relative velocities of the cooling air and the rotor 4 is reduced. As to the velocity component of the cooling air thus discharged, by making a velocity component in the rotational direction of the rotor the same as the circumferential velocity of the connecting opening 337a, pressure loss generated during the introduction of the cooling air from the connecting opening 337a to the pressurizing passage 337 can be prevented. The cooling air is fed into the rotor cavity 334 and a pressure thereof is increased at the pressurizing passage 337 due to pumping action generated by the centrifugal power of the pressurizing passage 337. Then, the cooling air is supplied to the cooling passage 336 and is released from the rotor base 331a of the rotor blade to the turbine rotor blade 331. Thus, the turbine rotor blade 33 is cooled by the cooling air supplied to the turbine rotor blade 33.

Pressure fluctuation of the cooling air discharged from the nozzle 326 between the outlet 326a and the rotor blade 331 will be described in greater detail below with reference to FIGS. 2 to 4.

Pressure fluctuations at the outlet 326a (P1) of the nozzle 326 and the connecting opening 337a (P2) of the pressurizing passage 337 as well as the following points are indicated: downstream side of the pressurizing passage 337 (P3); an interior of the cooling passage 336 (P4); combustion gas near the rotor blade 331 (P5); the upstream side (P6) of the seal portion 329; and downstream side of the seal portion 329 (P7: the combustion cavity 351 on the upstream side). Pressure fluctuation between the outlet 326a (P1) of the nozzle 326 and the interior of the rotor cavity 334 (P2) can be calculated based on the principle of free vortex flowing rotationally. Regarding the other points, pressure fluctuation is calculated from pressure loss of a fluid.

Generally, when pressure fluctuation generated by fluid flowing rotationally is calculated, the relationship between a distance r from the rotational center of the fluid and a fluid pressure (static pressure) is expressed in Formula 1:

$$P_2/P_1 = \{1+[(k-1)/k]\} \times [(r_2 \times V_{\theta 2})^2 / 2RT_1] \times [(1/r_1)^2 - (1/r_2)^2]^{(k/1-k)},$$

where P denotes a pressure (static pressure), r denotes a rotational radius, $V_\theta$ denotes a velocity component of fluid in the tangential direction, T denotes a fluid temperature, R denotes gas constant, k denotes a ratio of specific heat. Formula 1 expresses relative pressure fluctuation at a comparison position 2 with respect to a reference position 1.

In FIG. 2, when it is assumed that the outlet 326a of the nozzle 326 is a reference position P1 as well as the cooling air discharged from the outlet 326a flows through the rotor cavity 334 and reaches the connecting opening 337a (comparison position P2) of each pressurizing passage 337, a pressure fluctuation at the connecting opening 337a (comparison position P2) with respect to the outlet 326a (reference position P1) can be calculated by using Formula 1. As shown in Formula 1, a pressure fluctuates depending on a rotational radius (a distance r from the rotational center of the rotor) at a comparison position. Pressure fluctuation at the connecting opening 337a (comparison position P2) located at the most downstream end of the cooling air flow within the rotor cavity 334 assuming that the pressure at the outlet 326a (reference position P1) is the reference pressure is shown in FIG. 3. The pressure within the rotor cavity 334 (the connecting opening 337a (P2)) is indicated as the reference pressure.

Figure 3:
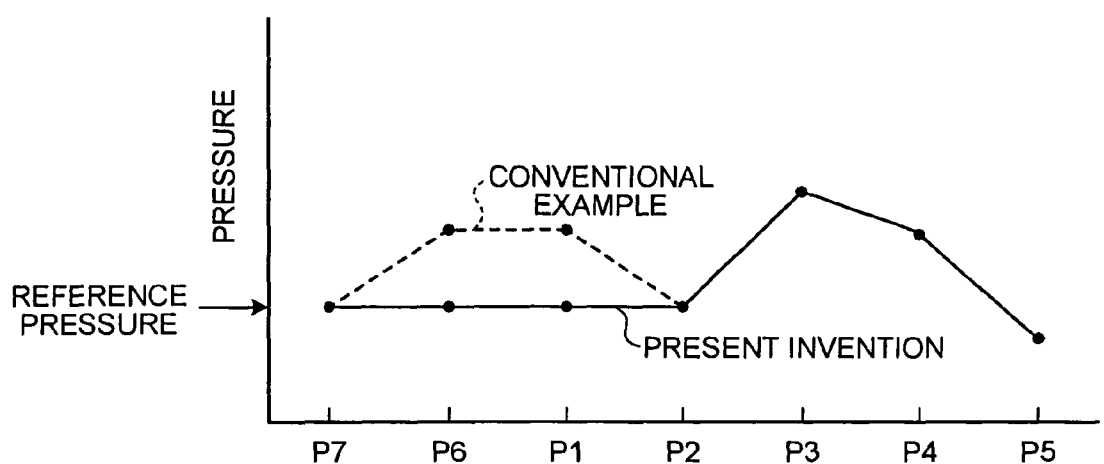
FIG. 3 is a diagram of pressure fluctuation of cooling air in the gas turbine shown in FIG. 1.
Figure 4:
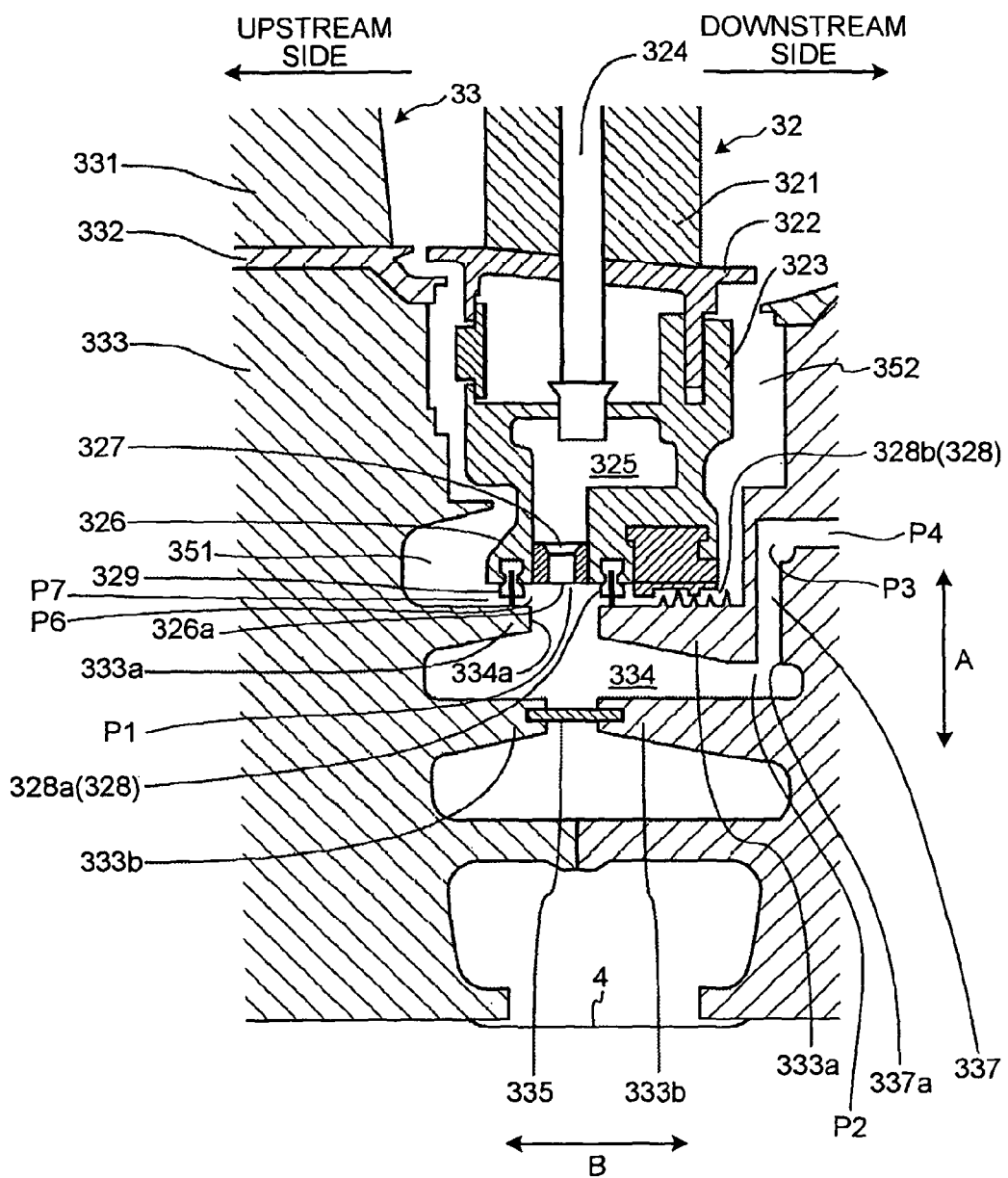
FIG. 4 is a schematic of an inner structure of a turbine according to a conventional example.

In FIG. 3, the outlet 326a (P1) of the nozzle 326; the connecting opening 337a (P2) of the pressurizing passage 337; downstream side of the pressurizing passage 337 (P3); an interior of the cooling passage 336 (P4); combustion gas near the rotor blade 331 (P5); upstream side of the seal portion 329 (P6: a vicinity of the seal portion 329 on the side of the rotor cavity); and downstream side of the seal portion 329 (P7: the combustion cavity 351 on the upstream side) are indicated as well as relative pressure fluctuations at each position is indicated. The horizontal axis denotes reference position and the vertical axis denotes pressure. In the diagram of the pressure fluctuation, a continuous line denotes the present invention and a dotted line denotes a conventional example. The conventional example means a gas turbine as shown in FIG. 4 in which a distance between the connecting opening 337a of the pressurizing passage 337 within the rotor cavity 334 and the rotational center of the rotor 4 is smaller than a distance between the nozzle outlet 326a and the rotational center of the rotor 4 (a gas turbine in which the nozzle outlet 326a is inner than the connecting opening 337a in the radial direction of the rotor 4). A structure shown in FIG. 4 is basically similar to the structure shown in FIG. 2, except for a shape of the nozzle 326, a discharging direction of the outlet 326a, relative position of the outlet 326a and the rotor cavity 334. Therefore, the same reference numerals are used for the same elements in FIGS. 2 and 4, with detailed description thereof abbreviated.

As shown in FIG. 3, in the present invention, a distance of the outlet 326a (P1) of the nozzle 326 and a distance of the connecting opening 337a (P2) from the rotational center of the rotor 4 are configured to be the same. In the configuration, pressures at the positions are the same according to Formula 1, and the pressure stays almost constant without appreciable fluctuation between the outlet 326a (P1) and the connecting opening 337a (P2). In the conventional example shown in FIG. 4, however, the outlet 326a (P1) is further away from the rotational center of the rotor 4 than the connecting opening 337a (P2). As a result, a pressure at the connecting opening 337a (P2) is smaller than a pressure at the outlet 326a (P1) according to Formula 1, which is shown in FIG. 3 by a dotted line as pressure fluctuation thereof. While the cooling air flows from the outlet 326a (P1) of the nozzle 326 to the connecting opening 337a (P2) on the rotor cavity 334, a swirling velocity (a velocity component of the cooling air in the tangential direction) of the cooling air flowing therethrough can be made to be the same as a circumferential velocity of the connecting opening 337a (P2). Then, little or no pressure loss occurs. Therefore, pressure within the rotor cavity 334 can be safely assumed to be constant as long as no fluctuation occurs in the distance from the rotational center.

Pressure fluctuation of the cooling air flowing from the connecting opening 337a (P2) of the pressurizing passage 337 into the pressurizing passage 337 depends on pressure loss of the cooling air flow generated while the cooling air flows from the connecting opening 337a (P2) to the rotor blade 331. Therefore, pressure fluctuations of the present invention and of the conventional example are the same.

The cooling air flowing from the connecting opening 337a into the pressurizing passage 337 is pressurized within the pressurizing passage 337. More specifically, the pressurizing passage 337 is a channel arranged radially in the radial direction in the disk 333 and the cooling air flowing thereinto from the connecting opening 337a (P2) receives centrifugal power. Therefore, the cooling air is pressurized due to the pumping action generated by the centrifugal power. When the cooling air flows through the cooling passage 336 and flows from the rotor base 331a of the rotor blade 331 into the rotor blade 331, a pressure thereof is slightly reduced due to a pressure loss generated thereat. The cooling air supplied into an interior of the rotor blade 331 is discharged to combustion gas (P5) after cooling the interior of the rotor blade 331. A pressure within the rotor cavity 334 is, however, uniquely decided by a pressure of the combustion gas (P5) at the end of the rotor blade 331, to which the cooling air is discharged. More specifically, a pressure within the rotor cavity 334 can be calculated by adding the pressure loss generated through a cooling air passage to a pressure of flow of the combustion gas. A pressure of the combustion gas (P5) near the rotor blade 331 is smaller than a pressure of downstream side (P7) of the seal portion 329 because pressure loss is generated due to the combustion gas passing through the stationary blade 321 and the rotor blade 331. The description above can be applied both to the present invention and to the conventional example. Therefore, in the present invention and the conventional example, pressure fluctuations generated while the cooling air flows from the connecting opening 337a (P2) of the pressurizing passage 337 to the combustion gas (P5) near the rotor blade 331 through the rotor blade 331 are the same, as shown by a continuous line in FIG. 3.

In the present invention and the conventional example, pressures near the outlet 326a of the nozzle 326 are different. Therefore, leakage of the cooling air to combustion gas is an issue to be discussed.

In the present invention shown in FIG. 2, a distance of the outlet 326a (P1) of the nozzle 326 is the same as a distance of the rotor cavity 334 from the rotational center of the rotor 4. As a result, no differential pressure is generated therebetween. In the conventional example shown in FIG. 4, rotational radii r of the outlet 326a and the rotor cavity 334 are different as described above. As a result, a differential pressure is generated. More specifically, because the seal portion 329 is disposed near the outlet 326a of the nozzle 326, in the conventional example, when a pressure at the outlet 326a (P1) is relatively higher than a pressure within the rotor cavity 334 (a pressure of the connecting opening 337a (P2)), a pressure on the upstream side (P6) of the seal portion 329 neighboring the outlet 326a is higher than a pressure within the rotor cavity 334 (a pressure at the connecting opening 337a (P2)). A pressure on the combustion chamber gas cavity 351 on the upstream side is, however, decided by the combustion gas. Therefore, the pressure is not affected by the pressure fluctuation generated around the outlet 326a (P1). Thus, if a pressure at the outlet 326a (P1) increases, a differential pressure generated across the seal portion 329 also increases. As a result, leakage of the cooling air from the side of the rotor cavity 334 to the side of the combustion gas is facilitated. In the pressure fluctuation of the conventional example shown by the dotted line in FIG. 3, a pressure at the outlet 326a (P1) of the nozzle 326 is relatively higher than a pressure within the rotor cavity 334 (a pressure at the connecting opening 337a (P2)), and a pressure on the upstream side (P6) of the seal portion 329 is almost the same as a pressure at the outlet 326a (P1). Therefore, a differential pressure generated between a combustion chamber gas cavity 351 (P7) and the upstream side (P6) of the seal portion 329 is comparatively high. As a result, the cooling air may leak via the seal portion 329.

In the present invention, a method to solve the issue of the leakage is provided. The outlet 326a (P1) of the nozzle 326 and the connecting opening 337a (P2) of the pressurizing passage 337 on the rotor cavity 334 are arranged so that distances of the outlet 326a (P1) and the connecting opening 337a (P2) in the radial direction from the central axis line S of the rotor 4 are the same. As a result, as shown in FIG. 3, a differential pressure is not generated between the combustion chamber cavity 351 (P7) on the upstream side and the upstream side (P6) of the seal portion 329. Therefore, the leakage of the cooling air is reduced and a thermal efficiency of the gas turbine is increased. A discharging condition of the cooling air at the nozzle 326 can be selected so that a velocity component of the cooling air in the rotational direction of the rotor immediately after the cooling air is discharged from the outlet 326a (P1) of the nozzle 326 is the same as a circumferential velocity of the connecting opening 337a (P2). Then, a pressure loss of the cooling air generated at the connecting opening 337a (P2) can be minimal. As a result, pressure fluctuation generated between the rotor cavity 334 and the rotor blade 331 can be stabilized, thereby increasing the reliability of the cooling capacity of the gas turbine.

As described above, a small amount of cooling air within the stationary blade cavity 325 is purged to the combustion chamber 351 on the upstream side via the purge hole 323c provided on the retaining ring 323, thereby preventing the combustion gas from flowing backward from the side of the combustion gas (a gas path). When a differential pressure across the seal portion 329 is high (when difference of pressures of the combustion chamber cavity 351 (P7) on the upstream side and of the upstream side (P6) of the seal portion 329 is large) as in conventional technology, if the seal portion 329 is damaged or deteriorated, cooling air within the rotor cavity 334 leaks from the seal portion 329 to the combustion chamber cavity 351 on the upstream side, and cooling air supplied to the rotor blade is decreased in amount. Therefore, the rotor blade is not cooled enough. In the present invention, however, the outlet 326a (P1) of the nozzle 326 and the connecting opening 337a (P2) of the pressurizing passage 337 on the rotor cavity 334 are arranged as described above so that distances of the outlet 326a (P1) and the connecting opening 337a (P2) in the radial direction from the central axis line S of the rotor 4 are the same. As a result, a differential pressure is not generated between the combustion chamber cavity 351 (P7) on the upstream side and the upstream side (P6) of the seal portion 329, and the pressures at the points are almost the same. Therefore, even if the seal portion 329 is damaged or deteriorated, leakage of cooling air within the rotor cavity 334 to the combustion chamber cavity 351 on the upstream side via the seal portion 329 can be avoided, and purge air flow to the side of the combustion gas can be stabilized.

In the present invention, the amount of cooling air leaking to the side of the combustion gas can be minimal, and cooling air can be steadily supplied to the rotor blade. Therefore, reduction of thermal efficiency of the gas turbine can be avoided.

In the embodiments described above, the gas turbine cooling air supplying structure may be applied to all the sets of turbine rotor blades 33 of the turbine 3, or may be applied only to certain sets of turbine rotor blades 33 that are cooled.

According to the embodiments of the present invention, the outlet of the nozzle and the connecting opening of the pressurizing passage are arranged so that distances of the outlet and of the connecting opening from the central axis line of the rotor in the radial direction are the same. Therefore, a pressure of the cooling air immediately after the cooling air is discharged from the outlet of the nozzle can be the same as a pressure of the cooling air sent to the pressurizing passage from the connecting opening. As a result, differential pressure acting on the seal member on the upstream side can be reduced. Thus, leakage of the cooling air into the turbine casing can be avoided and drop of the heat exchange in the gas turbine can be avoided.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A cooling air supply structure that is provided in a gas turbine in which compressed air compressed by a compressor is ignited by supplying fuel thereto in a combustion chamber and combustion gas thus generated is transferred to a turbine casing of the turbine, thereby generating rotating power of a rotor, and that supplies cooling air to a turbine rotor blade of the turbine, the cooling air supply structure comprising:

an introducing passage that is provided within a turbine stationary blade fixed within the turbine casing, and connects an interior and an exterior of the turbine casing;

a rotor cavity that is provided in the rotor, and forms a space having an opening along a circumferential direction of the rotor;

a nozzle that is provided on an inner circumference of the turbine stationary blade in a manner that the nozzle communicates with the introducing passage, and that has an outlet for cooling air facing the opening of the rotor cavity, and a swirler at the outlet;

a seal member provided between the turbine stationary blade and the rotor;

a cooling passage provided within a fixing member that is fixed to the rotor and rotates therewith, and that fixes the turbine rotor blade; and a pressurizing passage that communicates the cooling passage to the rotor cavity, wherein the outlet of the nozzle and a connecting opening of the pressurizing passage on the rotor cavity are arranged so that distances of the outlet and of the connecting opening from a central axis line of the rotor in a radial direction of the rotor are same.

2. The cooling air supply structure of the gas turbine according to claim 1, wherein the seal member is constituted of a brush seal.

3. A gas turbine, in which compressed air compressed by a compressor is ignited by supplying fuel thereto in a combustion chamber and combustion gas thus generated is transferred to a turbine casing of the turbine, thereby generating rotating power of a rotor, the gas turbine comprising:

an introducing passage that is provided within a turbine stationary blade fixed within the turbine casing, and connects an interior and an exterior of the turbine casing;

a rotor cavity that is provided in the rotor, and forms a space having an opening along a circumferential direction of the rotor;

a nozzle that is provided on an inner circumference of the turbine stationary blade in a manner that the nozzle communicates with the introducing passage, and that has an outlet for cooling air facing the opening of the rotor cavity, and a swirler at the outlet;

a seal member provided between the turbine stationary blade and the rotor;

a cooling passage provided within a fixing member that is fixed to the rotor and rotates therewith, and that fixes the turbine rotor blade; and a pressurizing passage that communicates the cooling passage to the rotor cavity, wherein the outlet of the nozzle and a connecting opening of the pressurizing passage on the rotor cavity are arranged so that distances of the outlet and of the connecting opening from a central axis line of the rotor in a radial direction of the rotor are same.

4. The gas turbine according to claim 3, wherein the seal member is constituted of a brush seal.

* * * * *